Figure 3:
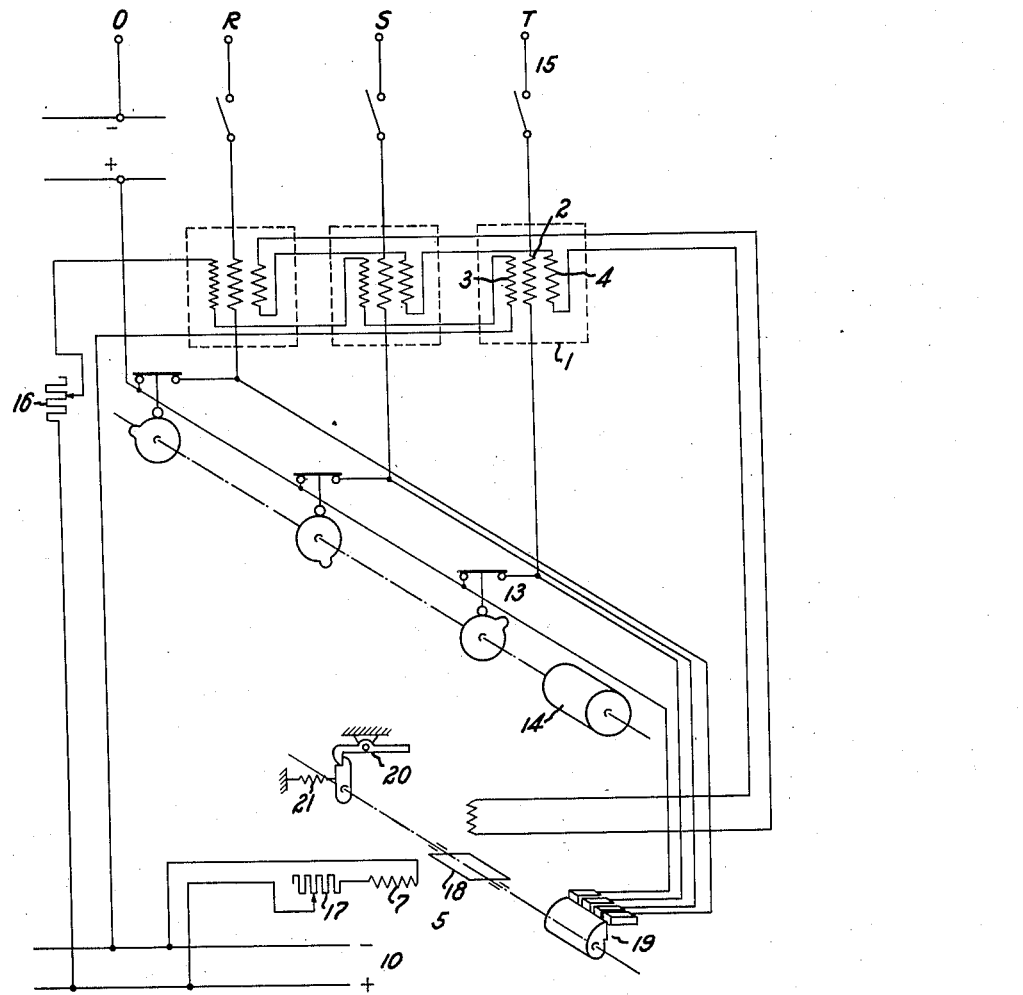

May 11, 1948. A. GOLDSTEIN 2,441,484
PROTECTIVE DEVICE FOR DIRECT CURRENT PLANTS
Filed April 10, 1944 2 Sheets-Sheet 1
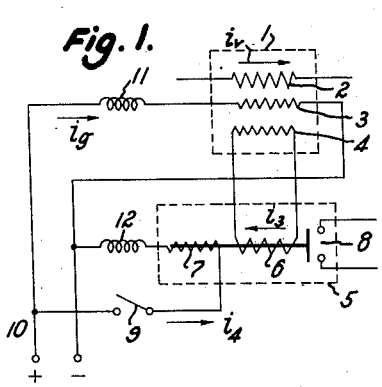
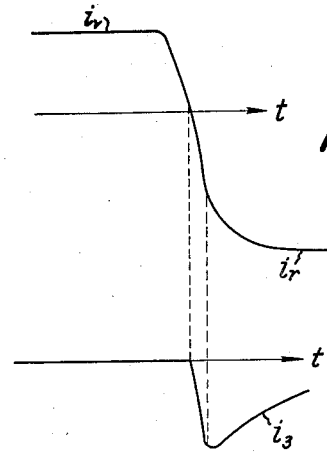
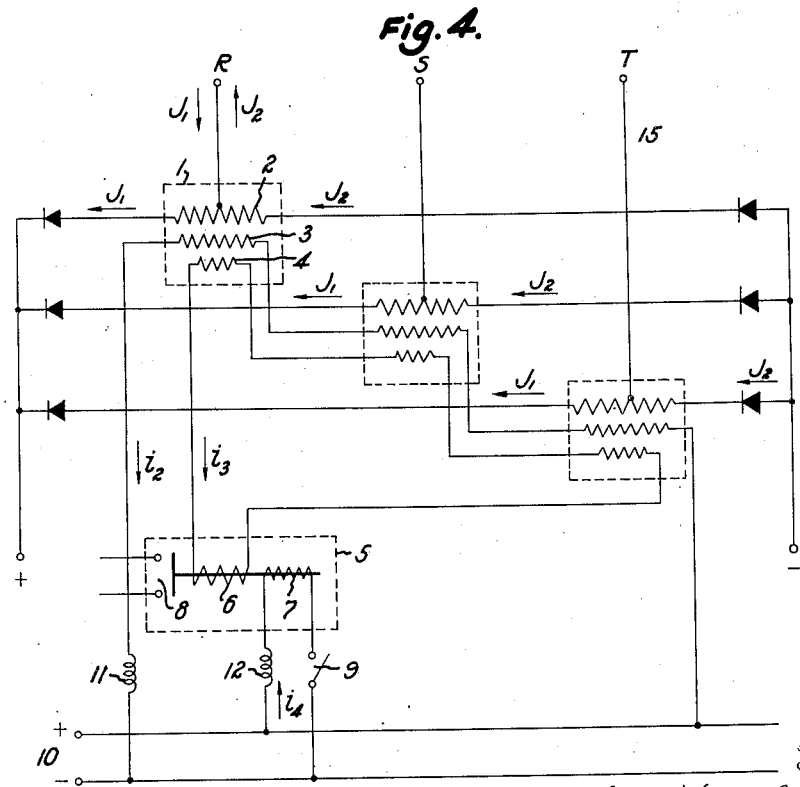
Inventor:
Alexander Goldstein,
By Pierce & Scheffler,
Attorneys.

Patented May 11, 1948

2,441,484

UNITED STATES PATENT OFFICE 2,441,484

PROTECTIVE DEVICE FOR DIRECT-CURRENT PLANTS

Alexander Goldstein, Wettingen, Switzerland, assignor to Aktiengesellschaft Brown, Boveri & Cie, Baden, Switzerland Application April 10, 1944, Serial No. 530,403
In Switzerland March 12, 1943

Section 1, Public Law 690, August 8, 1946
Patent expires March 12, 1963

1 Claim. (Cl. 175—294)

The present invention concerns a device for protecting electrical direct-current installations against reverse currents. It consists of three-winding current transformers which are located in the circuits endangered by the return currents, one winding of each transformer being supplied from a constant direct voltage, the transformer cores being pre-magnetised up to saturation in the direction of the outgoing current. As long as the outgoing current flows through the primary coils, the primary and secondary circuit of each transformer is uncoupled, whilst when a reverse current occurs the cores of the transformers are desaturated due to a reversal of the magnetisation. The changing primary current then causes a relay located in the secondary circuit of the transformer to operate, and due to the operation of this relay the reverse current is kept away from those parts of the plant which are to be protected.

Constructional examples of the invention are illustrated diagrammatically in Figs. 1, 3 and 4 of the accompanying drawings.

In Fig. 2 curves are shown which demonstrate certain operating characteristics of the three-winding transformer, the abscissae being in units of time and the ordinates being in units of current.

In the arrangement shown in Fig. 1 the reference numeral 1 indicates the three-winding transformer whose primary winding 2 lies in a direct-current line. The iron core of transformer 1 whose magnetisation characteristic has a sharply defined saturation bend, is premagnetised beyond the saturation bend by the direct current $i_g$ flowing through the premagnetising coil 3 of the transformer 1 in the direction of the outgoing current. According to the current-time diagram shown in Fig. 2 no current flows in the secondary circuit of the transformer 1 as long as the primary coil 2 has an outgoing current $i_v$ flowing through it. When the reversal of the magnetisation of the transformer core caused by the reverse current $i_r$ commences a current impulse $i_3$ will, however, be induced in the secondary winding 4 of the transformer which excites the coil 6 of relay 5. The relay is thus brought into operation and closes contact 8, whereby for instance a signal device is actuated, a switch opened, or parts of the plant endangered by the reverse current are short-circuited. By means of the holding current $i_4$ flowing through a second relay coil 7 relay 5 is maintained in the switched-in position until current $i_4$ is interrupted by the contact 9.

The holding current circuit is connected to the constant direct voltage in network 10 which latter also supplies the premagnetising coil 3. The choking coils 11 and 12 serve to prevent the current changes in the primary and secondary circuits of the transformer from reaching the premagnetising and holding current circuits.

The short actuating current impulse enables a relay to be employed which can be kept in the closed position by a holding current which amounts to only a fraction of the actuating current value.

The dimensions of the relay contacts corresponding to the small holding current and the fairly high power of the reverse current circuit with which the relay is excited, favour an operation whereby operating times, such as are required for an effective reverse current protection, can be obtained.

The arrangements shown in Figs. 3 and 4 illustrate two further important applications of the device according to the invention.

Fig. 3 shows a diagrammatic arrangement of a three-phase mechanical converter with the three contacts 13 and their driving motor 14. The primary windings 2 of the three current transformers 1 are located in the supply leads 15 of the converter. The premagnetising coils 3 and the secondary windings 4 of the transformers are each connected in series. The winding 6 of relay 5 lying in the secondary circuit is thus excited by each reverse current occurring in any one of the three phases. The premagnetising windings 3 and the relay winding 7 are supplied from the constant direct voltage of the network 10 and the currents flowing in their circuits can be adjusted by means of the regulating resistances 16 and 17. The windings 6 and 7 of relay 5 are arranged to cooperate with a rotating coil in the form of a conductive frame 18. If a secondary current induced in any of the three secondary windings 4 by reverse current occurring in any of the three phases flows in the relay winding 6, a current will also be induced in the frame 18, so that this latter in the field of the relay winding 7 has a torque produced in it and thus closes the short-circuiting device 19 which is located on the same axis, whereupon the mechanical converter is short-circuited as shown in the drawing. The short-circuiting device 19 is kept in the closed position by the latch 20 and when this latter is lifted it is opened again by the return spring 21.

Fig. 4 shows a three-phase valve converter in so-called Graetz connection, the three current transformers 1 being located in the supply leads 15. The primary winding 2 of each current transformer is divided into two halves which are so connected that the valve currents $J_1$ and $J_2$ flowing through these halves magnetize the transformer cores in the same direction during normal operation. As soon as back-arcing occurs the reverse current causes relay 5 to operate in the manner described in connection with Fig. 1, whereby the reverse current is kept away from the parts of the plant which are endangered. Whether it is better to disconnect or short-circuit these parts of the plant depends upon the prevailing conditions and it may be advisable to combine disconnection with short-circuiting.

Both halves of the primary winding 2 of the current transformer 1 have an alternating direct current flowing through them. The currents thus induced in the secondary circuit by this direct current are on account of the rectified transformer premagnetisation very small when compared with the reverse current impulses and therefore do not influence the relay device.

I claim:

The combination with a polyphase rectifier system comprising a pair of rectifier valves per phase, said rectifiers of each phase being connected across the direct current load circuit in the same relative conductive direction and wherein each phase of the alternating current supply source is adapted to be connected in circuit between the rectifiers associated therewith, of a transformer for each phase, each said transformer having a core, a primary winding connected between the rectifiers of its associated phase, each phase of said alternating current source being connected to the mid-point of the transformer primary winding individual thereto, a secondary winding, and a magnetizing winding energized from a direct current source to magnetize said core to saturation in the same direction that it is magnetized by normal current flow through the primary winding, relay means, and means connecting said secondary windings in series circuit relation to said relay means.

ALEXANDER GOLDSTEIN.

REFERENCES CITED

The following references are of record in the file of this patent:

UNITED STATES PATENTS

| Number | Name | Date |
| --- | --- | --- |
| 484,549 | Brace | Oct. 18, 1892 |
| 769,973 | Wilson | Sept. 13, 1904 |
| 833,194 | Andrews | Oct. 16, 1906 |
| 2,001,897 | West et al. | May 21, 1935 |
| 2,169,866 | Bedford | Aug. 15, 1939 |
| 2,303,581 | Rudd | Dec. 1, 1942 |